United States Patent
Ohya et al.

[11] Patent Number: 5,869,913
[45] Date of Patent: Feb. 9, 1999

[54] ELECTRIC MOTOR USING PERMANENT FIELD MAGNETS

[75] Inventors: Masaaki Ohya, Isesaki; Koji Nara, Maebashi; Yoshikazu Sato, Fukaya; Michio Okada, Gunma; Shinichi Nagashima, Ashikaga; Eiichi Kimura, Kiryu, all of Japan

[73] Assignee: Mitsuba Corporation, Gunma-Ken, Japan

[21] Appl. No.: 893,294

[22] Filed: Jul. 15, 1997

[30] Foreign Application Priority Data

Jul. 16, 1996 [JP] Japan ................................. 8-205290

[51] Int. Cl.⁶ .................................................. H02K 5/10
[52] U.S. Cl. ........................... 310/86; 310/154; 310/258; 310/260; 310/60
[58] Field of Search ............................... 310/86, 154, 60, 310/258, 260

[56] References Cited

U.S. PATENT DOCUMENTS 2,911,549 11/1959 Culk .......................................... 310/86
5,698,914 12/1997 Shiga et al. ............................... 310/60

FOREIGN PATENT DOCUMENTS 5-59661 6/1986 Japan .

Primary Examiner—Nestor Ramirez
Assistant Examiner—Thanh Lam
Attorney, Agent, or Firm—Skjerven Morrill MacPherson Franklin & Friel LLP; Alan H. MacPherson

[57] ABSTRACT

In an electric motor comprising a plurality of permanent magnets (46) surrounding a motor armature (52) for supplying field flux to the armature, a cylindrical magnet cover (47) is fitted into an inner circumferential surface defined by the permanent magnets to protect the permanent magnets against chipping and other damages. The magnet cover is further provided with a radial flange (47b) having guide holes (47c) formed therein so that set bolts (48) passed axially inside the motor casings may be favorably guided as they are inserted from one axial end of the motor casing to the other. Preferably, to better guide the bolts, the guide holes may be each provided with a cylindrical guide boss (50, 51) which may be formed either by burring or cutting and lifting a part of the material of the flange.

8 Claims, 6 Drawing Sheets

ELECTRIC MOTOR USING PERMANENT FIELD MAGNETS

TECHNICAL FIELD

The present invention relates to an electric motor including a plurality of permanent magnets disposed along an inner circumferential surface of a cylindrical yoke for supplying field flux to a motor armature, and a magnet cover fitted into an inner circumferential surface defined by the permanent magnets.

BACKGROUND OF THE INVENTION

In an electric motor including a plurality of permanent magnets disposed along an inner circumferential surface of a cylindrical yoke for supplying field flux to a motor armature, normally, the motor casing is formed by closing the axial ends of the cylindrical yoke with a pair of end plates, and joining the end plates to the cylindrical yoke by passing a pair of set bolts axially through the two end plates. Each of such set bolts is required to be fitted into a hole provided in one of the end plates, and after being passed through the interior of the yoke, is required to be properly fitted and threaded in an associated threaded hole provided in the other end plate. Because the set bolts are relatively long, and the threaded hole is not visible to the assembling personnel, there has been some difficulty in aligning the free threaded end of the set bolt with the associated threaded hole. In particular, this difficulty has prevented full automatization of the assembly work.

In such an electric motor, the permanent magnets are made of material having magnetically desirable properties, but are often highly brittle. Therefore, it has been proposed, for instance in Japanese patent publication No. 5-59661, to fit a cylindrical magnet cover inside an inner circumferential surface defined by the permanent magnets to reinforce the permanent magnets against chipping and prevent any fragments of the permanent magnets from dislodging from the permanent magnets.

Noting the above-mentioned difficulty in assembling the motor, and the need for the provision of a magnet cover, the inventors have discovered that by providing a flange to the magnet cover and forming bolt guide holes in the flange, it is possible to aid the aligning of the bolts passed through one of the end plates with the associated threaded holes formed in the other end plate.

BRIEF SUMMARY OF THE INVENTION

In view of such problems of the prior art and the discovery made by the inventors, a primary object of the present invention is to provide an improved electric motor using permanent field magnets which is made easier to assemble without any significant additional cost.

A second object of the present invention is to provide an improved electric motor which is adapted for automatic assembly.

According to the present invention, these and other objects can be accomplished by providing an electric motor, comprising: an armature rotatably supported in a generally cylindrical casing; a plurality of permanent magnets which are disposed on an inner circumferential surface of the casing so as to surround the armature and supply field flux to the armature; and a magnet cover having a generally cylindrical main part which closely fits into an inner circumferential surface defined by the permanent magnets; wherein the magnet cover further comprises a radial flange having a guide hole for receiving a bolt which is passed axially through the casing.

To better guide the bolt, the guide hole may be provided with an axial collar extending in a direction for passing the bolt to prevent the threaded section from being caught by the guide hole. The axial collar may be formed by fitting a separate collar member in the guide hole or attaching a separate collar member to the periphery of the guide hole, but to minimize the cost and simplify the process of forming the axial collar, the axial collar may be formed by a burring process or by cutting a part of the material of the flange and bending the part away from the flange. In view of favorably avoiding the thread section from being caught by the axial collar, the axial collar is preferably at least as long as a pitch of a thread of the bolt.

To minimize the radial dimension of the electric motor, the bolt may be passed axially through a gap defined between opposing edges of an adjacent pair of the permanent magnets. The magnet cover is made of non-magnetic material such as aluminum or an aluminum alloy. According to a preferred embodiment of the present invention, the casing comprises a cylindrical main part serving as a magnetic yoke of the permanent magnets, and a pair of opposing end members closing respective axial ends of the cylindrical main part, and the bolt is passed into a hole provided in one of the end members, and has a free end which is threaded into a corresponding threaded hole provided in the other of the end members. The electric motor of the present invention is suitable for application in engine starter motors, but may also be applied to other forms of motor-actuated equipment.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
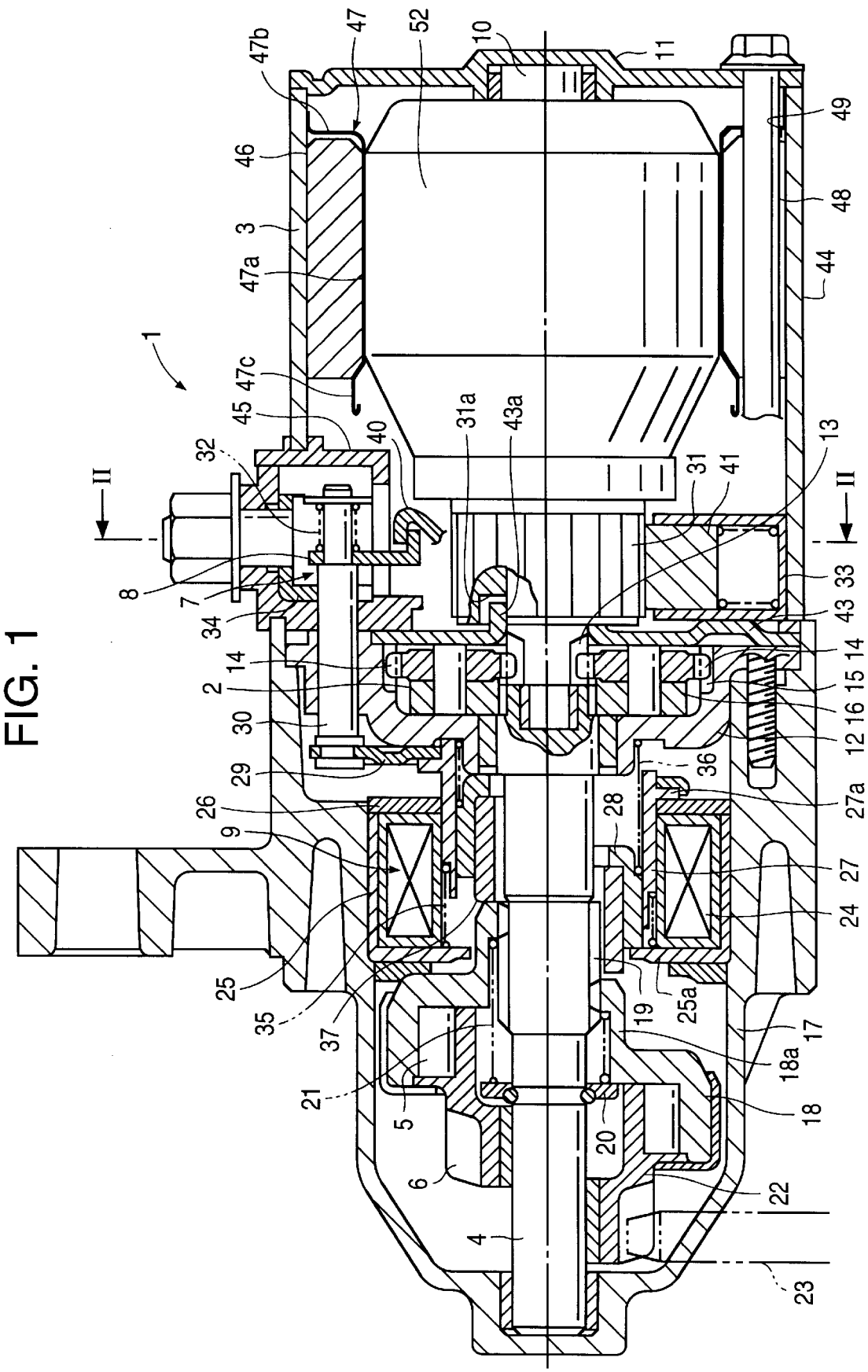
FIG. 1 is a sectional view of an engine starter incorporated with a first embodiment of the present invention, the upper half of the drawing showing the rest condition of the starter while the lower half shows the operative condition of the engine starter.

FIG. 1 generally illustrates an engine starter equipped with a starter motor which is constructed according to the present invention, and the upper half of the drawing illustrates the starter at its inoperative state while the lower half of the drawing illustrates the starter at its operative state. This starter 1 produces a torque which is necessary for cranking and starting an internal combustion engine, and comprises an electric motor 3 equipped with a planetary gear reduction gear unit 2, an output shaft 4 connected to the electric motor 3 via the reduction gear unit 2, a one-way roller clutch 5 and a pinion 6 which are slidably mounted on the output shaft 4, a switch unit 7 for selectively opening and closing the electric power line leading to the electric motor 3, and a solenoid device 9 for axially moving a moveable contact 8 of the switch unit 7 as well as the pinion 6.

The electric motor 3 consists of a known commutator type DC electric motor, and its rotor shaft 10 carrying a motor armature 52 is pivotally supported in a central recess of a bottom plate 11 at its right end, and pivotally supported in a central recess provided in a right end surface of the output shaft 4, which is coaxially disposed with respect to the rotor shaft 10, at its left end. The bottom plate 11 closes a right end of a cylindrical motor casing 44.

The reduction gear unit 2 is provided in a recess defined on the inner surface of the top plate 12 of the electric motor 3 which closes the left end of the motor casing 44. The top plate 12 may consist of synthetic resin material. The reduction gear unit 2 comprises a sun gear 13 which is formed in a part of the rotor shaft 10 adjacent to the output shaft 4, a plurality of planetary gears 14 meshing with the sun gear 13, and an internal teeth ring gear 15 formed along the outer periphery of the recess defined on the inner surface of the top plate 12 to mesh with the planetary gears 14. A support plate 16 supporting the planetary gears 14 is attached, by press fitting, to the right end of the output shaft 4 which is pivotally supported in a central opening of the top plate 12.

To the top plate 12 is attached a pinion housing 17 which also serves as a securing bracket for mounting the starter to the engine. The left end of the output shaft 4 is pivotally supported in a central recess defined on the inner surface of the left wall of the pinion housing 17.

The outer circumferential surface of a middle part of the output shaft 4 engages the inner circumferential surface of a clutch outer member 18 of the oneway roller clutch 5 via a helical spline 19. The clutch outer member 18 is normally urged to the right by a return spring 21 interposed between an annular shoulder defined in a cylindrical sleeve 18a extending from the clutch outer member 18 toward the electric motor 3 and a stopper plate 20 secured to a left end portion of the output shaft 4. The right extreme end of the cylindrical sleeve 18a engages the helical spline 19 formed in the output shaft 4.

The clutch outer member 18 engages a clutch inner member 22 of the one-way roller clutch 5 in an axially fast but rotationally free relationship (which depends on the direction of relative rotation). The outer circumferential surface of the left end of the clutch inner member 22 is integrally formed with the aforementioned pinion 6 which meshes with the ring gear 23 of the engine to drive the same. The clutch inner member 22 integrally formed with the pinion 6 is fitted on the left end of the output shaft 4 in a both rotationally and axially free relationship.

In an intermediate part of the pinion housing 17 is secured an energization coil 24 which surrounds the output shaft 4 made of non-magnetic material such as stainless steel. The energization coil 24 is surrounded by a yoke defined by a cup-shaped holder 25 having an internal flange 25a surrounding the output shaft 4 and an annular disk 26. In a gap defined between the inner circumferential surface of the energization coil 24 and the outer circumferential surface of the output shaft 4 is disposed an armature outer member 27 and an armature inner member 28, both made of ferromagnetic material, in a mutually coaxially nested and axially slidable relationship. The left ends of the armature members 27 and 28 oppose the axially inner surface of a central part of the internal flange 25a of the holder 25, and the central part of the internal flange 25a serves as a magnetic pole for the armature members 27 and 28.

The first part of the armature or the armature outer member 27 is connected at its right end to a connecting plate 29, and, via a connecting rod 30 passing through the top plate 12 of the electric motor 3, to the moveable contact 8 of the switch unit 7 placed adjacent the commutator 31 of the electric motor 3. The moveable contact 8 is mounted to the connecting rod 30 in an axially moveable manner, and is supported by a coil spring 32 in a floating relationship so as to be selectively engaged to and disengaged from a fixed contact 34 of the switch unit 7 which is fixedly secured to a brush stay 33 provided around the commutator 31. In other words, the moveable contact 8 is linked to the armature outer member 27 via a lost motion mechanism. The armature outer member 27 is always urged to the right by a return spring 35 interposed between the armature outer member 27 and the internal flange 25a provided in the holder 25 of the energization coil 24, but is normally at its neutral or rest position separating the moveable and fixed contacts 8 and 34 from each other.

The second part of the armature or the armature inner member 28 is always urged to the left with respect to the top plate 12 by a coil spring 36 which is weaker that the return spring 21 of the clutch outer member 18. The armature inner member 28 is connected to a shifter member 37 made of non-magnetic material, such as synthetic resin material, having a left end engaging the right end of the clutch inner member 22.

The energization coil 24 is electrically connected to an ignition switch not shown in the drawing via a connector 38 (see FIG. 2) provided in the switch unit 7.

Figure 2:
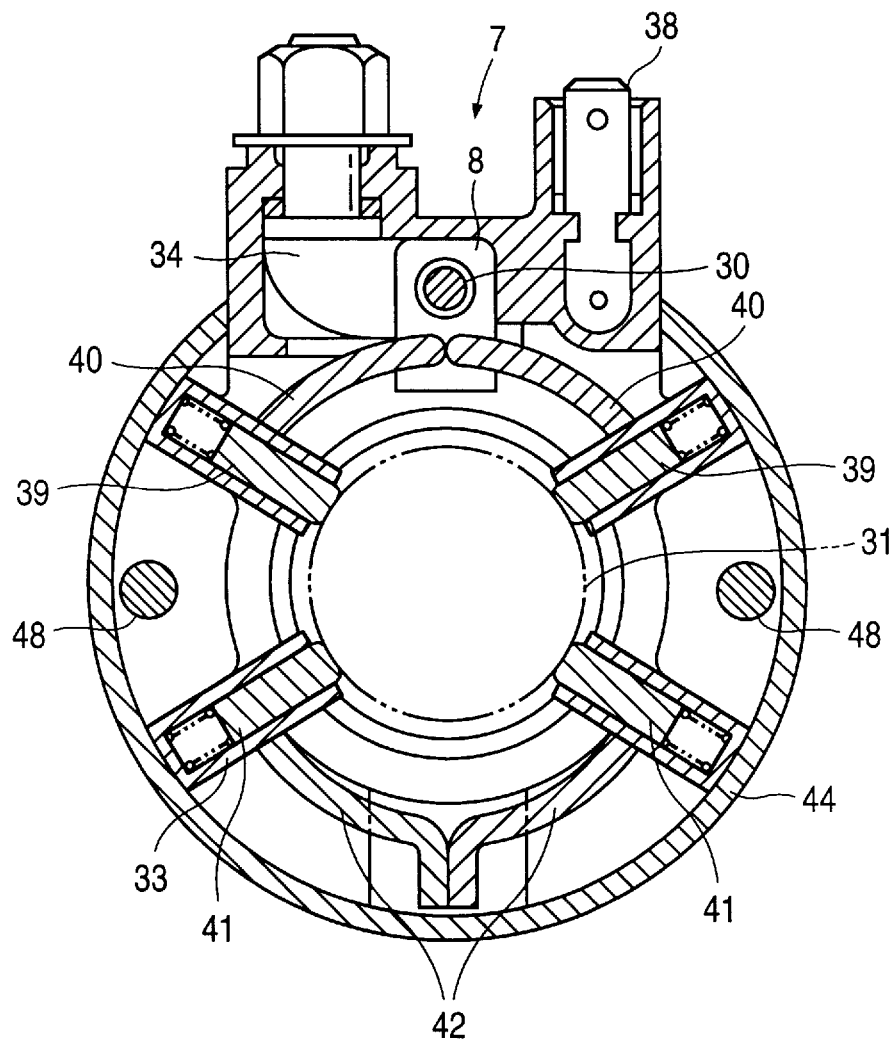
FIG. 2 is a sectional view taken along line II—II of FIG. 1.

The fixed contact 34 of the switch unit 7 is electrically connected to the positive terminal of a battery not shown in the drawings, and a pair of pigtails 40 connected to a pair of positive pole brushes 39 are attached to the fixed contact 34 by spot welding also as illustrated in FIG. 2. A pair of negative pole brushes 41 are provided in a line-symmetrically opposing positions with respect to the positive pole brushes 39. The pigtails 42 for these negative pole brushes 41 are connected to a center plate 43 which is described hereinafter, and is connected to the negative terminal of the battery via the pinion housing 17 and the vehicle body which is not shown in the drawings. The switch unit 7 is provided in a space flanked by the positive pole brushes 39. The brushes 39 and 41 are supported in a known manner by a brush stay 33 which is made of electrically insulating material.

An annular metallic center plate 43 is interposed between the brush stay 33 and the top plate 12 to separate the reduction gear unit 2 from the electric motor 3. A central part of the center plate 43 is provided with a cylindrical portion 43a which projects toward the commutator 31 with its inner circumferential surface receiving the outer circumferential surface of the rotor shaft 10 defining a small gap therebetween. The free end of the cylindrical portion 43a is received in a recess 31a formed in an axial end surface of the commutator 31 to prevent grease from leaking out of the reduction gear unit 2 to the commutator 31.

The switch unit 7 is located at a top part of the starter 1, and the contacts, or the fixed contact 34 secured to the brush stay 33 and the moveable contact 8, are covered by the brush stay 33 and a switch cover 45 to prevent any particulate foreign matters that may be produced from the brushes from getting into the switch unit 7.

At least a pair of permanent magnets 46 are arranged circumferentially along the inner circumferential surface of the motor casing 44 of the electric motor 3, and the inner circumferential surface of the permanent magnets 46 is covered by a magnet cover 47. The magnet cover 47 comprises a cylindrical main portion 47a which engages the inner circumferential surface of the permanent magnets 46, a flange portion 47b extending in the shape of letter L radially from one of the cylindrical main portion 47a into abutting engagement with the inner circumferential surface of the motor casing 44, and a large diameter portion 47c which is formed as a slightly enlarged section at the other axial end of the cylindrical main portion 47a so as to extend closely along a tapered sections of the permanent magnets 46.

The flange portion 47b is provided with a pair of holes 49 for passing set bolts 48 which extend in the axial direction to integrally join the pinion housing 17, the top plate 12, the motor casing 44 and the bottom plate 11. Each of the set bolts 48 is passed through a hole formed in the top plate 12, and the interior of the motor casing 44, and the free end of each set bolt 48 is provided with a threaded section which is received in a corresponding threaded hole formed in the pinion housing 17. The set bolts 48 are circumferentially arranged at diagonally opposite positions, and are received in recesses defined between adjacent side edges of the permanent magnets 46.

Figure 3:
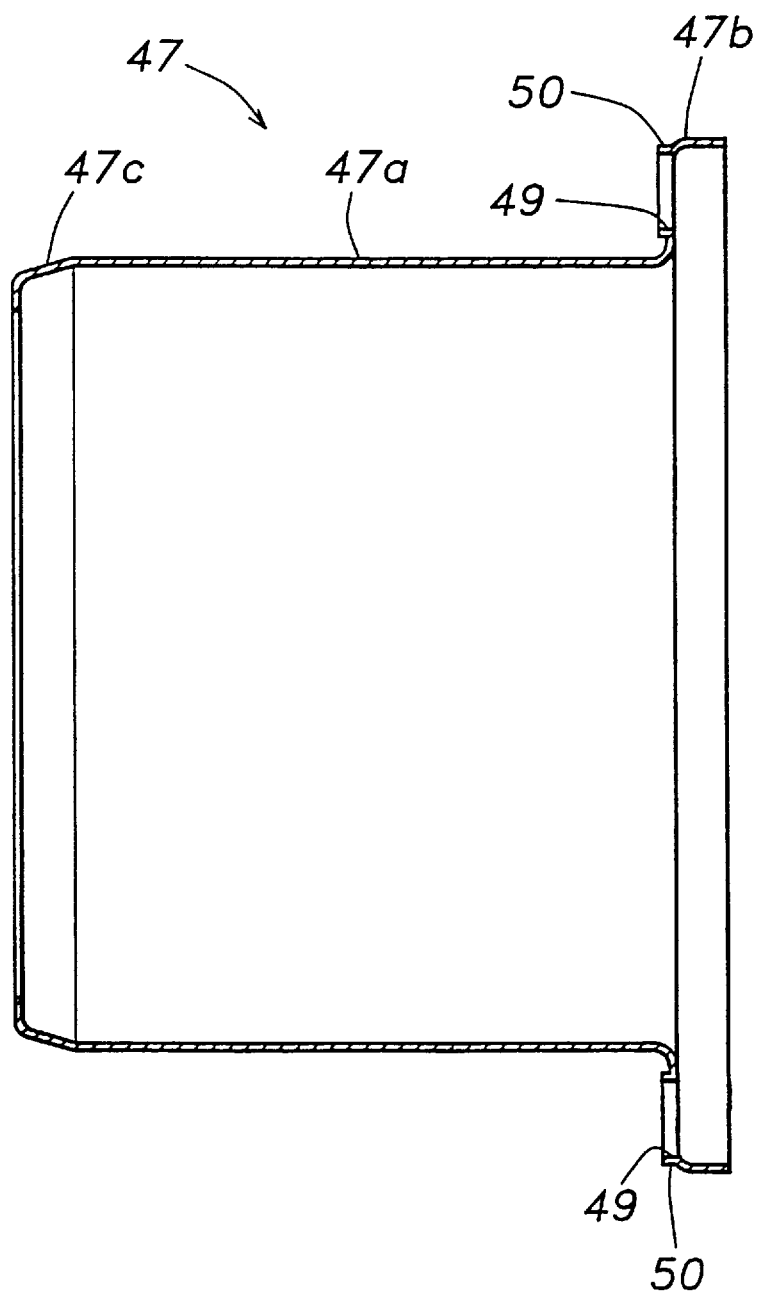
FIG. 3 is a sectional view showing the initial condition of the magnet cover shown in FIG. 1.
Figure 4:
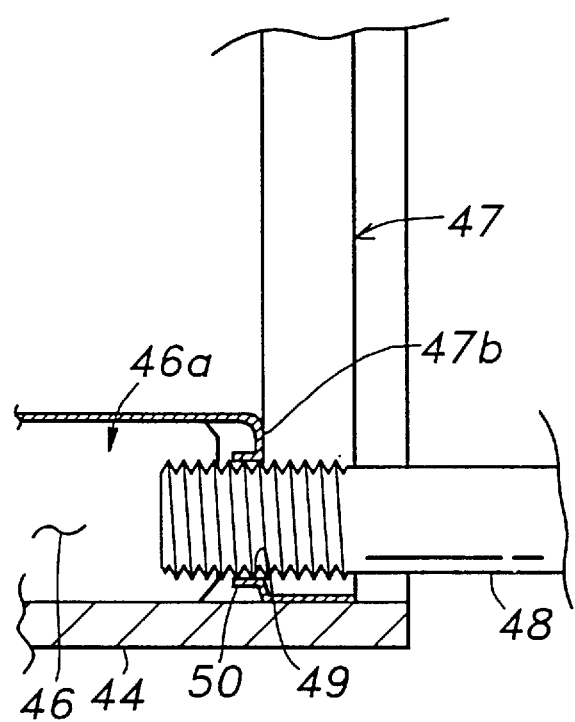
FIG. 4 is a fragmentary view showing one of the guide holes of the magnet cover receiving a threaded free end of a bolt.

The magnet cover 47 is made of malleable metallic material such as aluminum or an aluminum alloy, and the large diameter portion 47c is initially provided with a diameter which is even smaller than that of the main portion 47a thereof as illustrated in FIG. 3. The outer diameter of the main portion 47a of the magnet cover 47 is slightly larger than the inner diameter of the permanent magnets 46 arranged on the inner circumferential surface of the motor casing 44. The magnet cover 47 is press fitted, with the large diameter portion 47c first, into the inner space defined by the permanent magnets 46 from the open end of the bottom plate 11.

The bolt passing holes 49 of the magnet cover 47 are each provided with a cylindrical guide collar 50 by a burring process or a stretch flanging process, and the length of each of the guide collars 50 is longer than the pitch of the thread of the set bolt 48. Therefore, when each of the set bolts 48 is passed into the bolt passing hole 47 from the open end of the bottom plate 11 as a step of assembling the motor 3, the set bolt 48 is favorably guided by the guide collar 50.

Now the operation of the above described embodiment is described in the following. In the inoperative condition, because no electric current is supplied to the energization coil 24, the armature outer member 27 is at its rightmost position under the spring force of the return spring 35, and the moveable contact 8 which is connected to the armature outer member 27 is spaced from the fixed contact 34. At the same time, the clutch outer member 18 which is urged by the return spring 21 is at its rightmost position along with the clutch inner member 22 which is integral with the pinion 6, the shifter member 37 and the armature inner member 28 with the result that the pinion 6 is disengaged from the ring gear 23.

When the ignition switch is turned to the engine start position, electric current is supplied to the energization coil 24 to magnetize the same. As a result, a magnetic path for conducting a magnetic flux is established in the armature inner and outer members 27 and 28 thereby moving the armature inner and outer members 27 and 28 to the left. The armature outer member 27, as it is closer to the central part (pole) of the internal flange 25a of the holder 25 than the armature inner member 28, moves before the armature inner member 28 does. As a result, the moveable contact 8 is moved to the left by the armature outer member 27 via the connecting plate 29 and the connecting rod 30, and comes into contact with the fixed contact 34. This in turn causes the electric power of the battery to be supplied to the electric motor 3, and the rotor shaft 10 to be turned. Because the moveable contact 8 comes into contact with the fixed contact 34 before the armature outer member 27 moves its full stroke, and the moveable contact 8 is mounted on the connecting rod 30 in an axially floating relationship, the pressure of the coil spring 32 is applied between the two contacts 8 and 34. At this point, the armature outer member 27 comes to a stop with a certain gap defined between the left end surface of the armature outer member 27 and the central part of the internal flange 25a because of the presence of an external flange 27a integrally formed at the right end of the armature outer member 27, serving as a stopper, comes into contact with the annular disk 26.

As the rotor shaft 10 turns, this rotation is reduced in speed by the reduction gear unit 2, and is transmitted to the output shaft 4. Because of the inertia of the clutch outer member 18 which engages with the output shaft 4 via the helical spline 19, the axial force owing to the helical spline 19 is applied to the clutch outer member 18, causing it to move to the left. At the same time, the armature inner member 28, which is subjected to the leftward attractive force by the energization coil 24 and the pressure from the coil spring 36, starts moving to the left. In particular, because of the preceding movement of the armature outer member 27, the magnetic gap is reduced, and this increases the magnetic attractive force acting on the armature inner member 28. This force is applied to the clutch outer member 18 as an axial force via the shifter member 37.

According to the present embodiment, this axial force pushes the clutch outer member 18 leftward against the biasing force of the return spring 21, and the pinion 6, which is integral with the clutch inner member 22 and is therefore integrally engaged with the clutch outer member 18, is also pushed leftward. Once the clutch outer member 18 engages with the stopper plate 20, and the pinion 6 comes into full mesh with the ring gear 23, the rotation of the output shaft 4 is transmitted to the ring gear 23, and starts the engine. At this point, the left end surface of the armature inner member 28 engages the central part of the internal flange 25a of the holder 25, and a small gap is defined between the left end surface of the shifter member 37 which has integrally moved with the armature inner member 28 and the clutch outer member 18. Because the armature inner member 28 receives a maximum attractive force of the energization coil 24 as it engages the central part of the internal flange 25a of the holder 25, even when the pinion 6 is subjected to a force which tends to disengage it from the ring gear 23, the rightward movement of the clutch outer member 18 is prevented by the shifter member 37, and the pinion 6 is prevented from dislodging from the ring gear 23.

The electric current that is required to keep the armature inner and outer members 27 and 28 stationary after they have moved the full stroke is substantially smaller than that required for starting the movement of the armature inner and outer members 27 and 28. In other words, by making use of the axial force owing to the helical spline 19 for starting the movement of the one-way roller clutch 5 including the pinion 6, the output requirement of the energization coil 24 can be reduced, and the size of the energization coil 24 can be accordingly reduced. Once the engine has started and the rotational speed of the engine exceeds that of the pinion 6, the pinion 6 will start turning freely by virtue of the one-way roller clutch 5 in the same manner as in the conventional engine starter.

When the supply of electric current to the energization coil 24 ceases, owing to the biasing force of the return spring 21 acting upon the clutch outer member 18 and the biasing force of the return spring 34 acting upon the armature outer member 27, the pinion 6 is disengaged from the ring gear 23 and the moveable contact 8 is separated from the fixed contact 32, thereby stopping the electric motor 3.

Figure 5:
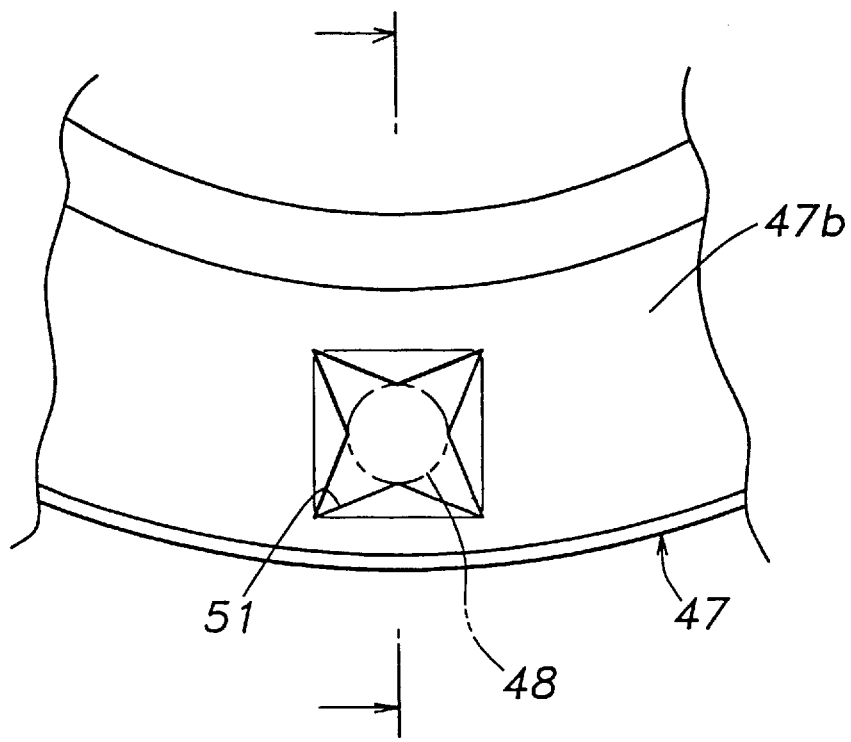
FIG. 5 is a fragmentary front view of one of the guide holes of a second embodiment.
Figure 6:
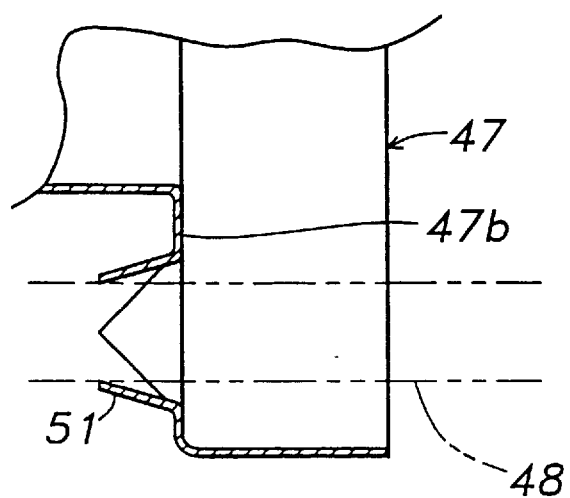
FIG. 6 is a sectional view taken along line VI—VI of FIG. 6.

In the above described embodiment, the cylindrical guide collars 50 were formed around the bolt passing holes 49 by a burring process, but other processes may be used for forming such guide collars. For instance, as illustrated in FIGS. 5 and 6, it is also possible to make diagonal cuts at each position for forming the bolt passing hole 49, and lifting the triangular pieces 51 formed by cuts away from the surface of the flange 47, in the direction of passing the bolts 48, so that the bolt passing holes 49 and the cylindrical guide collars 51 may be formed at the same time.

Thus, according to the present invention, the set bolts can be readily and accurately passed into the motor casing so as to allow the free ends of the set bolts to be threaded into the associated threaded openings. In particular, the cylindrical guide collars favorably assist the proper alignment of the set bolts. Thereby, the assembly work is simplified for the assembling personnel, and is better adapted to automatic assembly processes.

Although the present invention has been described in terms of specific embodiments thereof, it is possible to modify and alter details thereof without departing from the spirit of the present invention.

What we claim is:

1. An electric motor, comprising:

an armature (52) rotatably supported in a generally cylindrical casing (44), said casing including a bottom plate (11);

a plurality of permanent magnets (46) which are disposed on an inner circumferential surface of said casing so as to surround said armature and supply field flux to said armature; and a magnet cover (47) having a generally cylindrical main part (47a) and a radial flange (47b), wherein said main part closely fits into an inner circumferential surface defined by said permanent magnets, and wherein said radial flange (47b) has a guide hole (49) for receiving a bolt (48) which is passed through said bottom plate and axially along said casing.

2. An electric motor according to claim 1, wherein said guide hole is provided with an axial collar (50, 51) extending in a direction for passing said bolt.

3. An electric motor according to claim 2, wherein said axial collar (50) is formed by a burring process.

4. An electric motor according to claim 2, wherein said axial collar (51) is formed by cutting a part of the material of said flange and bending said part away from said flange.

5. An electric motor according to claim 2, wherein said axial collar is at least as long as a pitch of a thread of said bolt.

6. An electric motor according to claim 1, wherein said bolt is passed axially through a gap (46a) defined between opposing edges of an adjacent pair of said permanent magnets (46).

7. An electric motor according to claim 1, wherein said magnet cover (47) is made of aluminum or an aluminum alloy.

8. An electric motor according to claim 1, wherein said casing comprises a cylindrical main part (44) serving as a magnetic yoke of said permanent magnets, and a pair of opposing end members (11) closing respective axial ends of said cylindrical main part, and said bolt is passed into a hole provided in one of said end members, and has a free end which is threaded into a corresponding threaded hole provided in the other of said end members (12, 17).

* * * * *